June 26, 1962  W. C. BELK  3,040,864
HIGH SPEED FEED MECHANISM
Filed Jan. 26, 1960  3 Sheets-Sheet 1
FIG_1
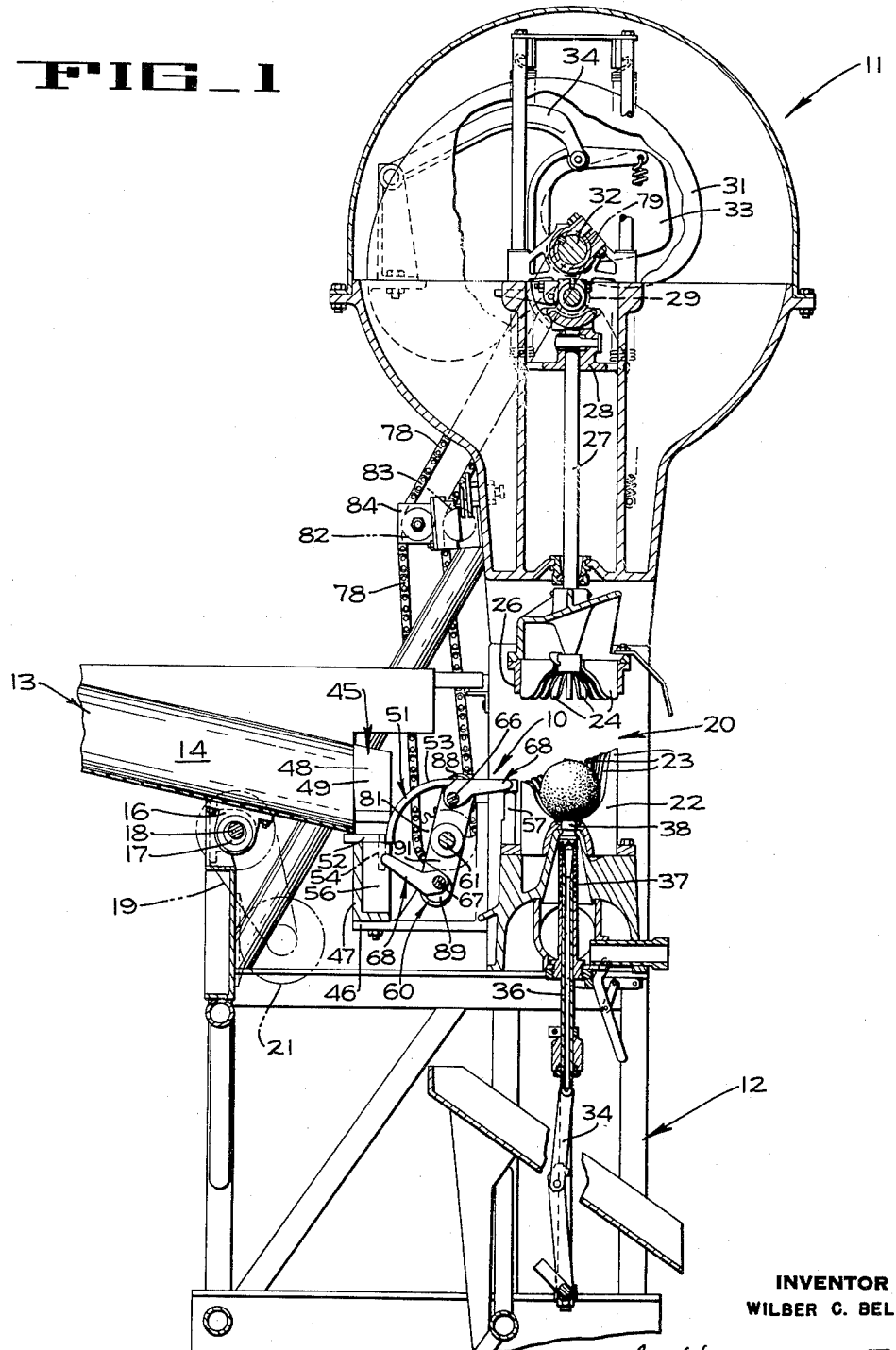
INVENTOR
WILBER C. BELK
BY Hans G. Hoffmeister
ATTORNEY June 26, 1962 W. C. BELK 3,040,864
HIGH SPEED FEED MECHANISM
Filed Jan. 26, 1960 3 Sheets-Sheet 2
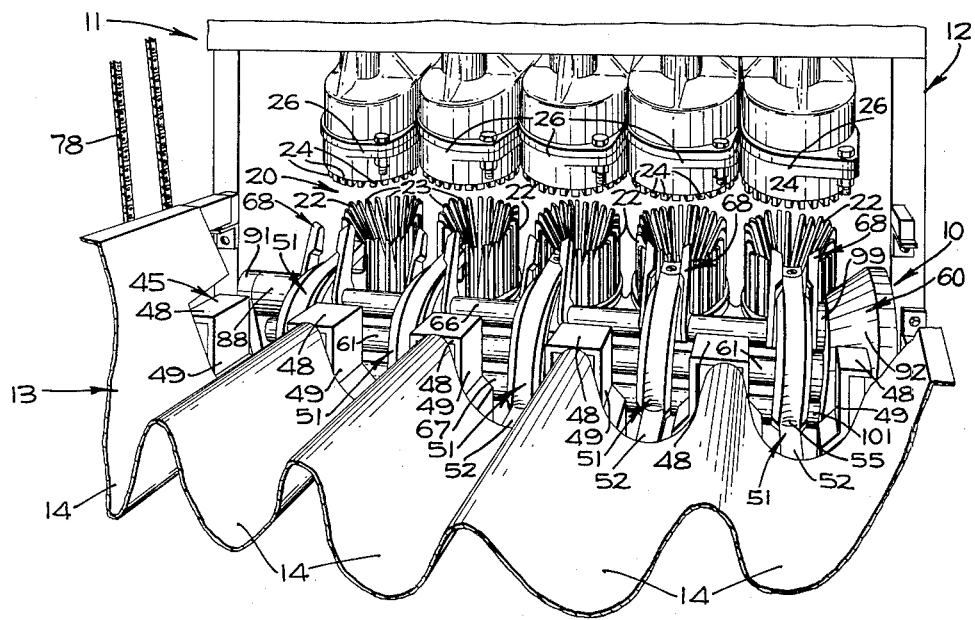
FIG_2
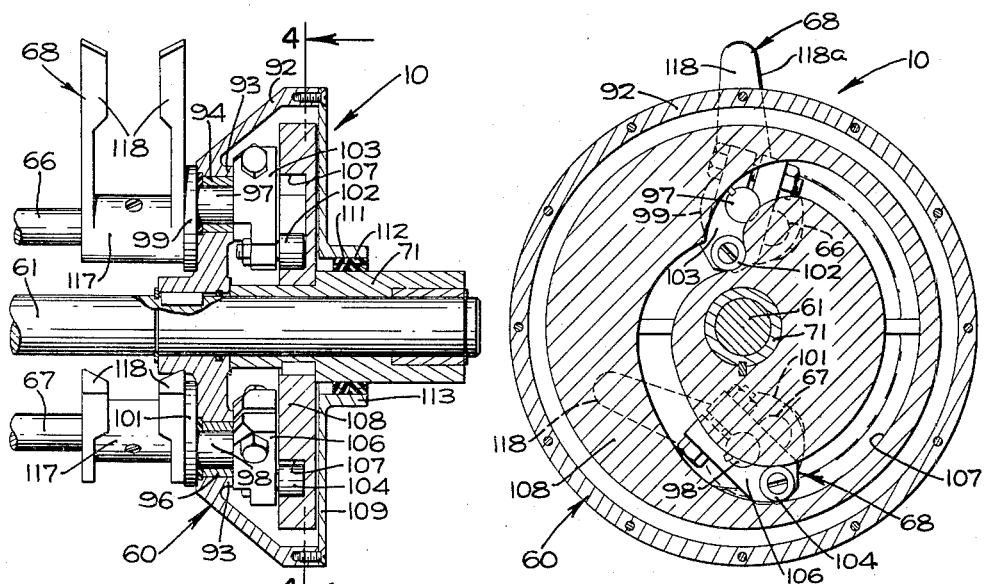
FIG_3 FIG_4
INVENTOR
WILBER C. BELK
BY Hans G. Hoffmeister
ATTORNEY June 26, 1962   W. C. BELK   3,040,864
HIGH SPEED FEED MECHANISM
Filed Jan. 26, 1960   3 Sheets-Sheet 3
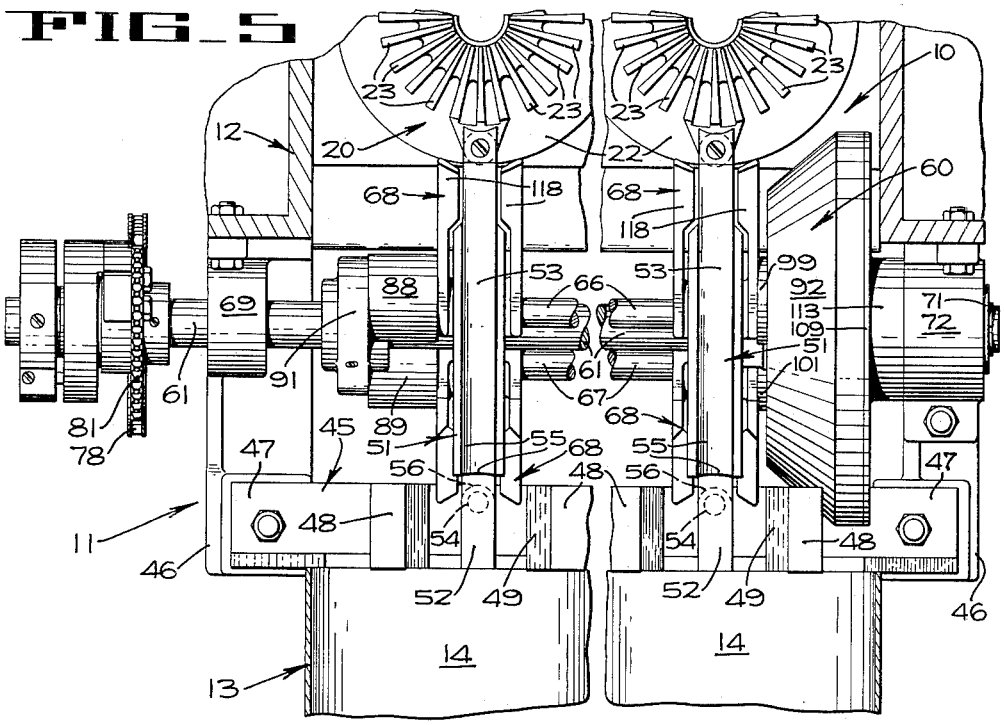
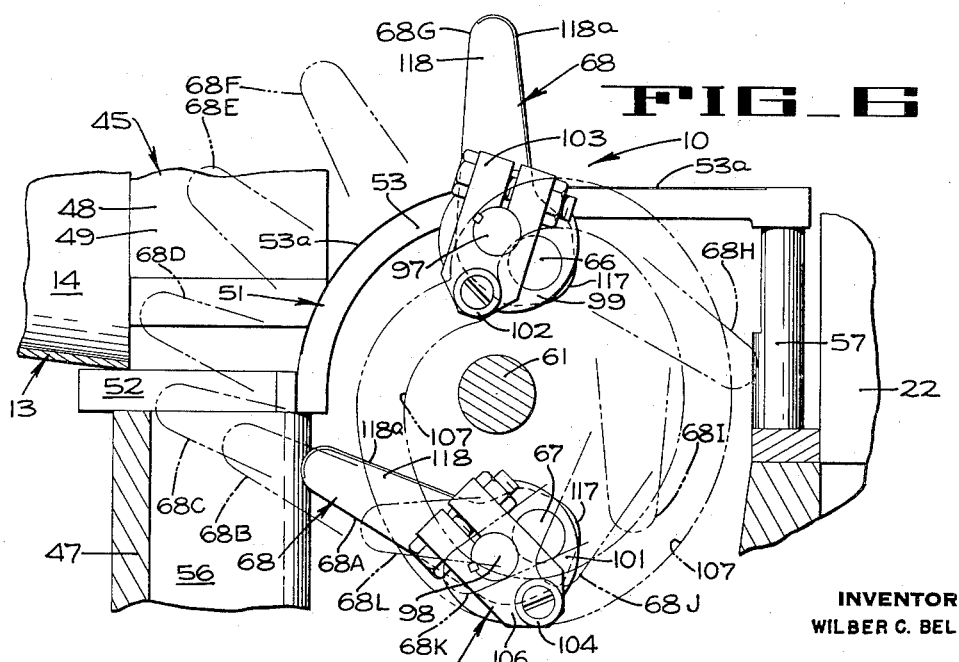
INVENTOR
WILBER C. BELK
BY Hans F. Hoffmeister
ATTORNEY

United States Patent Office 3,040,864
Patented June 26, 1962

3,040,864
HIGH SPEED FEED MECHANISM
Wilber C. Beik, Lakeland, Fla., assignor to FMC Corporation, a corporation of Delaware
Filed Jan. 26, 1960, Ser. No. 4,704
6 Claims. (Cl. 198—25)

The present invention appertains to a feed mechanism and more particularly relates to a high speed feed mechanism for a machine for handling generally spherical fruit such as citrus fruit.

One object of the present invention is to provide an improved high speed feed mechanism.

Another object is to provide a high speed feed mechanism which gently contacts a fruit and gently seats the fruit to obtain control thereof before rapidly accelerating the fruit toward a discharge zone.

Another object is to provide an improved high speed feed mechanism arranged to accelerate and accurately discharge articles along a predetermined path.

Another object is to provide an improved high speed cam actuated feed mechanism.

Another object is to provide a mechanism for controlling the speed of movement of fruit propelling members of a fruit feeding device.

These and other objects and advantages of the present invention will become apparent from the following description and the accompanying drawings, in which:

FIG. 1 is a vertical section, with certain parts cut away, of a citrus preparation machine employing the improved high speed feed mechanism of the present invention.

FIG. 2 is an enlarged perspective of the portion of the citrus preparation machine having the improved feed mechanism therein.

FIG. 3 is an enlarged fragmentary elevation partially in section of the right end portion of the feed mechanism of FIG. 2.

FIG. 4 is a section taken along line 4—4 of FIG. 3.

FIG. 5 is an enlarged plan of the improved feed mechanism, certain parts being broken away.

FIG. 6 is a diagrammatic operational view showing the location of the pickup fingers for each 30° increment of rotation of the feed mechanism.

Although the high speed feed mechanism 10 (FIGS. 1–4) of the present invention may be used with other machines, it is disclosed herein as associated with a citrus preparation machine 11 which is of the type disclosed in United States Letters Patent No. 2,649,730 issued to James M. Hait.

In general, the citrus preparation machine 11 comprises a frame 12 which supports an inclined chute 13 that is divided into several lanes 14 (FIG. 2). A strap 16 (FIG. 1) is bolted to the chute 13 and rotatably receives an eccentric 17 which is secured to an eccentric shaft 18 journalled on the frame 12. A V-belt drive 19 connects the shaft 18 to the drive shaft of a motor 21 mounted on the frame 12. The motor 21 drives the eccentric shaft 18 causing the chute 13 to oscillate longitudinally causing the fruit to roll down each lane 14 into the feed mechanism 10 of the present invention. The feed mechanism 10 rapidly moves the fruit from the several lanes 14 into lower cups 22 of squeezing units 20, one of which is aligned with each lane 14.

The lower cups 22 are mounted in fixed position on the frame 12, and each cup 22 includes a plurality of fingers 23 which interdigitate with fingers 24 of an upper cup 26. Each of the upper cups 26 is secured to a rod 27, which is mounted for vertical movement in the frame 12, and the several rods 27 are interconnected at their upper end by a cross head 28. The upper cups are moved downward into engagement with fruit in the lower cups by means of a cam follower 29 which is journalled on the cross head 28 and rides against a cam 31 which is secured to a main drive shaft 32. The drive shaft 32 is journalled in the frame 12 and is driven by a motor (not shown). A plunger cam 33 is rigidly secured to the drive shaft 32 and actuates a linkage 34, only a portion being shown, at the base of the machine which is connected to a tubular plunger 36 to reciprocate the same within a straining or finishing tube 37 which has a sharpened upper edge 38. The finishing tube 37 is secured to and projects upwardly within its associated lower cup 22.

In the operation of the citrus preparation machine 11, citrus fruit fills each lane 14 of the inclined chute 13 and gravitates downwardly in the lanes 14 to be discharged one at a time from the lanes 14 into the feed mechanism 10 of the present invention. The feed mechanism 10 rapidly advances the fruit into associated ones of the lower cups 22 when the upper cups 26 are in the raised position of FIG. 1. The upper cups 26 are then lowered by the cam 31 to engage and squeeze the fruit causing the pulp, juice and seeds to enter the finishing tubes 37. The plunger cam 33 then actuates the linkage 34 to raise the tubular plunger 36 within the finishing tube 37, causing the juice to flow through openings in the tube 37 to be collected thereafter in any suitable manner. The pulp and seeds are eventually forced out of the lower end of the plunger 36, and the peels are reduced to a pulp during the squeezing operation and are discharged from the cups 22 and 26.

The citrus preparation machine 11 has been briefly described herein only to illustrate one type of machine in which the high speed feed mechanism 10 of the present invention may be used. For a more detailed description of the machine 11, reference should be had to the above mentioned Hait patent.

The high speed feed mechanism 10 comprises a toothed casting 45 (FIGS. 1, 2 and 5) which extends laterally across the machine 11 immediately downstream of the chute 13. The opposite ends of the casting 45 are bolted to angle brackets 46 (FIG. 5) which are suitably secured to vertical portions of the frame 12. The toothed casting 45 comprises an angle support beam 47 (FIG. 1) which is integral with and provides a support for upstanding teeth 48 (FIG. 2), and the side walls of adjacent teeth cooperate to define receptacles 49 that momentarily support the fruit prior to the fruit being moved into the lower cups 22. As shown in FIG. 2, the teeth 48 are aligned with associated ridges of the inclined chute 13, and the receptacles 49 are aligned with the lanes 14.

A narrow bridge member 51 is disposed between each receptacle 49 and its associated lower cup 22. Each bridge member 51 includes a horizontal portion 52 (FIG. 6) which serves as a floor for its receptacle 49, and an arched portion 53 which bridges the gap between the receptacle 49 and its associated lower cup 22. Each arched portion is transversely concave as indicated at 55 (FIG. 5) so as to more adequately guide the fruit between its associated receptacle 49 and lower cup 22. A cover 53a (FIG. 6) of plastic material such as Teflon, is cemented to the bridge member to reduce friction between the fruit and the bridge member. The horizontal portion 52 of each bridge member 51 is held in place by a pin 54 (FIG. 1) which is integral with the horizontal portion 52 and is received in a hole in a narrow web 56 of the toothed casting 45. The other end of each bridge member 51 is bolted to a spacer 57 which is, in turn, bolted to the associated lower cup 22.

In order to advance the fruit from the several receptacles 49 to the lower cups 22, a rotary cam controlled feed reel 60 is provided. The reel 60 comprises a reel drive shaft 61 (FIGS. 5 and 6) and two actuating shafts 66 and 67 that are parallel to shaft 61. A plurality of fruit propelling bifurcated finger units 68 are carried by the shafts 66 and 67, one unit being disposed on each shaft between each receptacle 49 and its associated lower cup 22. Accordingly, as seen in FIG. 6, when the reel drive shaft 61 is rotated clockwise two fruit propelling units 68 are arranged to move through each receptacle 49 and successively lift an orange from the receptacle and advance it into the associated lower cup.

The drive shaft 61 is journalled for rotation in a bearing 69 (FIG. 5) that is bolted to one bracket 46, and in a sleeve 71 which is clamped to the other bracket 46 by a split block 72. The feed reel 60 is driven from the main drive shaft 32 (FIG. 1) by a chain 78 which is trained around a drive sprocket 79 keyed to the shaft 32, around a driven sprocket 81 keyed to the reel drive shaft 61 and around a pair of idler sprockets 82 and 83 journalled on a bracket 84 which is bolted to the frame 12. Since the feed reel 60 is arranged to feed two oranges into each lower cup 22 for each revolution of the shaft 61 and since the upper cup 26 must be moved downwardly once for each orange, the size of the drive sprocket 79 and driven sprocket 81 is such that the shaft 32 rotates twice as fast as the reel drive shaft 61.

At one end, the finger-supporting shafts 66 and 67 (FIGS. 1 and 5) are secured to crank arms 88 and 89, respectively, which are mounted for rotation on an end support plate 91 of the reel 60, which support plate 91 is keyed to the shaft 61 adjacent one end thereof. At their other end, the shafts 66 and 67 are supported in a rotatable housing 92 (FIG. 3) which is keyed to the reel shaft 61 and includes an inwardly directed wall 93 which defines an end wall of the reel 60. The wall 93 is drilled and provided with bushings 94 and 96 to rotatably receive crank pins 97 and 98, respectively, which are secured, as by welding, to crank arms 99 and 101, respectively. The crank arm 99 is secured to the shaft 66 and cooperates with the crank arm 88 to support the shaft 66 for rotation about an axis passing through the axes of rotation of the crank arm 88 and the crank pin 97. Similarly crank arm 101 and crank arm 89 cooperate to support the shaft 67 for rotation about an axis passing through the axes of rotation of the crank arm 89 and the crank pin 98. It will be recognized that upon rotation of the shaft 61, the axes of the crank arms 88, 89, 99 and 101 define circular paths which are equal in diameter and are concentric with the axis of the drive shaft 61.

In order to cause the shafts 66 and 67 and the fruit-propelling fingers to follow particular paths during rotation of the reel, a cam follower 102 is journalled for rotation on a lever 103 which is clamped on the pin 97, and a similar cam follower 104 is journalled on a lever 106 which is clamped on the pin 98. The followers 102 and 104 ride in a cam groove 107 in a cam plate 108 which is keyed to the stationary sleeve 71 and is disposed within the housing 92. The housing 92 is closed by a cover 109 bolted thereto and is sealed relative to the stationary sleeve 71 by a pair of seal rings 111 and 112 disposed between the sleeve 71 and a neck 113 of the cover 109.

Each of the aforementioned fruit-propelling finger units 68 includes a hub 117 (FIG. 3), which is clamped on its supporting shaft 66 or 67, and spaced fingers 118 which pass on opposite sides of one of the bridge members 51 and its supporting web 56 when the reel is rotated. Each fruit propelling unit 68 will, therefore, contact and positively advance a fruit from the horizontal portion 52 of the bridge 51 over the arched portion 53 and into the lower cup 22. The fruit contacting surfaces of the fingers 118 may have covers 118a (FIG. 6), made of Teflon or the like, cemented thereon to reduce friction between the fruit and the fingers 118.

Although the speed of the shaft 61 is constant, the peripheral speed of each fruit propelling unit 68 is not constant but is controlled by the configuration of the cam groove 107. FIGURE 6 diagrammatically illustrates positions 68A through 68L of the units 68 for each 30° increment of movement of the shaft 61. It will be recognized that the crank pins 97, 98 as well as the shaft 61 rotate at a constant angular velocity. As indicated by the relatively close spacing of positions 68A, 68B, and 68C of finger unit 68 as it moves upwardly in a clockwise direction to a point adjacent the horizontal portion 52 of the bridge member 51, the peripheral speed of the ends of the unit 68 is relatively low through this range. When the unit 68 moves past the portion 52 on which a fruit is resting, its peripheral speed is considerably less than the speed it would have reached if it were mounted directly to the shaft 61. At this point, the fruit propelling unit 68 engages the fruit and smoothly accelerates it upwardly through positions 68D, 68E, 68F to position 68G, where the unit 68 is traveling at a speed substantially equal to the speed it would have reached if it were connected directly to the shaft 61. Between position 68G and position 68H, the unit 68 rapidly flips the fruit into the adjacent lower cup 22 because the associated cam follower is moved into engagement with an abrupt rise in the cam groove 107. By using the low-friction covers 53a and 118a on the arched portion 53 and on fingers 118, respectively, the tendency for small or soft fruit, such as small limes or tangerines, to become pinched between the arched portion 53 and the associated fruit propelling units 68 is eliminated. This pinching problem does not occur with large fruit such as oranges. From position 68H to position 68A, the unit 68 is retracted to a position closely adjacent the shaft 61.

It is apparent that the stationary cam 108 may be clamped in positions other than the exact angular position shown in FIGURE 4 to either advance or retard the flipping action of the fruit propelling units 68.

From the foregoing description, it is apparent that the improved high speed feed mechanism of the present invention includes a continuously rotating reel which is controlled by a cam to cause fruit propelling units to engage the fruit at a relatively slow speed. After gaining control of the fruit at the slow speed, the fingers and the fruit are accelerated by the action of the cam to rapidly transfer the fruit from a pickup station to a discharge station without losing control of the fruit.

In the claims, the term "predetermined normal speed" will be considered to be the speed of the fruit-propelling finger units 68 when moving at the constant angular velocity of the reel and when projecting substantially radially outward from the reel as indicated by the unit 68G (FIG. 6).

While one embodiment of the present invention has been shown and described, it will be understood that various changes and modifications may be made without departing from the spirit of the invention or the scope of the appended claims.

The invention having thus been described, what is claimed to be new and desired to be protected by Letters Patent is:

1. A feed mechanism comprising means for supporting a fruit to be fed, fruit receiving means spaced from said fruit supporting means, rotatable finger-supporting means disposed between said fruit supporting means and said receiving means, a pickup finger pivotally mounted on said finger-supporting means and arranged to engage a fruit in said supporting means, means for rotating said finger-supporting means to carry the outer end of said finger along a portion of a curved path at a predetermined normal speed, said normal speed approximately equaling the speed of the finger supporting means, and control means connected to said finger and arranged to pivot said finger relative to said finger-supporting means to effect a reduction of the speed of the end of said finger from said normal speed as said finger enters said fruit supporting means to gently lift the fruit therefrom, and operable to effect a first acceleration of the finger relative to said supporting means to bring the fruit speed to approximately said normal speed, and operable to effect a second acceleration of the finger relative to said supporting means to materially increase the speed of the fruit over said normal speed to thereby cause the rapid feeding of the fruit.

2. A feed mechanism comprising a receptacle for supporting a fruit to be fed, means spaced from said receptacle for receiving the fruit removed from said receptacle, a reel mounted for rotation and disposed between said receptacle and said receiving means, a pickup finger carried for pivotal movement by said reel and arranged to enter said receptacle to engage and remove a fruit therefrom, means for rotating said reel at a substantially constant speed to move the outer end of said finger along a curved path at a predetermined normal speed, and control means connected to said reel and to said finger and arranged to pivot said finger relative to said reel to effect a reduction of peripheral speed of said finger from said normal speed as said finger enters said receptacle, said control means including a cam mechanism operatively connected to said finger and having a camming surface constructed and arranged to accelerate said finger after said finger passes through said receptacle to increase the fruit speed to approximately said normal speed, said control means being arranged to further accelerate said finger to cause said fruit speed to exceed said normal speed to thereby rapidly advance the fruit to said receiving means.

3. A feed mechanism comprising a receptacle for supporting fruit to be fed, means spaced from said receptacle for receiving the fruit removed from said receptacle, bridge means between said receptacle and said fruit receiving means, a reel disposed between said receptacle and said fruit receiving means, a bifurcated pickup finger eccentrically carried for pivotal movement on said reel and arranged to enter said receptacle and straddle said bridge means, means for rotating said reel, and control means connected to said finger and arranged to pivot said finger relative to said reel to effect a reduction of peripheral speed of said finger from said normal speed as said finger enters said receptacle.

4. A feed mechanism comprising a receptacle for supporting fruit to be fed, means spaced from said receptacle for receiving the fruit removed from said receptacle, bridge means between said receptacle and said fruit receiving means, a reel disposed between said receptacle and said fruit receiving means, a bifurcated pickup finger eccentrically carried for pivotal movement on said reel and arranged to enter said receptacle and straddle said bridge means, means for rotating said reel at a constant speed to carry said finger in a curved path at a predetermined normal speed, and control means connected to said finger and arranged to pivot said finger relative to said reel to effect a reduction of peripheral speed of said finger from said normal speed as said finger enters said receptacle, said control means being arranged to accelerate said finger after said finger passes through said receptacle to rapidly advance the fruit to said receiving means.

5. A feed mechanism comprising a receptacle for supporting fruit to be fed, means spaced from said receptacle for receiving the fruit removed from said receptacle, bridge means between said receptacle and said fruit receiving means, said bridge means having an arched longitudinally extending portion which is transversely concave to aid in supporting and guiding the fruit from said receptacle to said receiving means, a reel disposed between said receptacle and said fruit receiving means, a bifurcated pickup finger eccentrically carried for pivotal movement on said reel and arranged to enter said receptacle and straddle said bridge means, means for rotating said reel at a constant speed to move the outer end of said finger along a portion of a curved path at a predetermined normal speed, and control means connected to said finger and arranged to pivot said finger relative to said reel to effect a reduction of peripheral speed of the outer end of said finger from said normal speed as said finger enters said receptacle, said control means being arranged to accelerate the outer end of said finger after said finger passes through said receptacle to rapidly advance the fruit to said receiving means.

6. A high speed feed mechanism comprising a receptacle for supporting fruit to be fed, means spaced from said receptacle for receiving the fruit removed from said receptacle, bridge means between said receptacle and said fruit receiving means, a reel disposed between said receptacle and said fruit receiving means, a bifurcated pickup finger eccentrically carried for pivotal movement on said reel and arranged to enter said receptacle and straddle said bridge means during rotation of said reel, a cam follower connected to said finger, a stationary cam disposed adjacent said reel and in engagement with said cam follower, and means for rotating said reel, said cam being arranged to reduce the speed of the outer end of said finger as said finger enters said receptacle and to gradually increase the speed of the outer end of said finger as said finger moves from said receptacle toward said fruit receiving means.

References Cited in the file of this patent

UNITED STATES PATENTS

| | | |
|---|---|---|
| 2,497,767 | Hallead | Feb. 14, 1950 |
| 2,861,670 | Read et al. | Nov. 25, 1958 |